(12) United States Patent
Tyler et al.

(10) Patent No.: US 11,161,297 B2
(45) Date of Patent: *Nov. 2, 2021

(54) CONTROL METHODS FOR ADDITIVE MANUFACTURING SYSTEM

(71) Applicant: Continuous Composites Inc., Coeur d'Alene, ID (US)

(72) Inventors: Kenneth Lyle Tyler, Coeur d'Alene, ID (US); Blake L. Alfson, Hayden Lake, ID (US); Josiah D. Coad, Post Falls, ID (US); Kaleb Forrest Beebout, Post Falls, ID (US)

(73) Assignee: Continuous Composites Inc., Coeur d'Alene, ID (US)

( * ) Notice: Subject to any disclaimer, the term of this patent is extended or adjusted under 35 U.S.C. 154(b) by 42 days.

This patent is subject to a terminal disclaimer.

(21) Appl. No.: 16/814,972

(22) Filed: Mar. 10, 2020

(65) Prior Publication Data

US 2020/0207012 A1    Jul. 2, 2020

Related U.S. Application Data

(60) Continuation of application No. 16/401,541, filed on May 2, 2019, now Pat. No. 10,744,707, which is a (Continued)

(51) Int. Cl.
*B29C 64/165* (2017.01)
*B33Y 30/00* (2015.01)
(Continued)

(52) U.S. Cl.
CPC ........ *B29C 64/165* (2017.08); *B29C 35/0805* (2013.01); *B29C 64/106* (2017.08);
(Continued)

(58) Field of Classification Search
CPC ... B29C 64/165; B29C 64/171; B29C 64/176; B29C 64/194; B29C 64/20;
(Continued)

(56) References Cited

U.S. PATENT DOCUMENTS 3,286,305 A    11/1966  Seckel
3,809,514 A     5/1974  Nunez
(Continued)

FOREIGN PATENT DOCUMENTS

DE      4102257 A1    7/1992
EP      2589481 B1    1/2016
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
(Continued)

*Primary Examiner* — Stella K Yi
(74) *Attorney, Agent, or Firm* — Ryan C. Stockett

(57) ABSTRACT

A method is disclosed for controlling an additive manufacturing system. The method may include causing a head to discharge composite material along a first trajectory, and activating a cure enhancer to at least partially cure composite material discharging from the head along the first trajectory. The method may also include selectively deactivating the cure enhancer as the head nears a corner location, moving the head to a second trajectory after the head reaches the corner location, and reactivating the cure enhancer after moving the head to the second trajectory.

18 Claims, 3 Drawing Sheets

Related U.S. Application Data continuation of application No. 15/268,156, filed on Sep. 16, 2016, now Pat. No. 10,315,355, which is a division of application No. 13/975,300, filed on Aug. 24, 2013, now Pat. No. 9,511,543, application No. 16/814,972, which is a continuation of application No. 15/603,328, filed on Jun. 2, 2017, now Pat. No. 10,647,058.

(60) Provisional application No. 61/694,253, filed on Aug. 29, 2012, provisional application No. 62/383,801, filed on Sep. 6, 2016.

(51) Int. Cl.

| | | |
|---|---|---|
| *B29C 64/209* | (2017.01) | |
| *B29C 64/118* | (2017.01) | |
| *B29C 64/386* | (2017.01) | |
| *B29C 64/106* | (2017.01) | |
| *B33Y 10/00* | (2015.01) | |
| *B33Y 50/02* | (2015.01) | |
| *B33Y 70/00* | (2020.01) | |
| *B29C 35/08* | (2006.01) | |
| *B33Y 80/00* | (2015.01) | |
| *B29C 70/06* | (2006.01) | |
| *B29C 70/38* | (2006.01) | |
| *B29K 105/08* | (2006.01) | |
| *B29K 105/16* | (2006.01) | |
| *B29K 307/04* | (2006.01) | |
| *B29K 105/00* | (2006.01) | |
| *B29K 105/12* | (2006.01) | |
| *B29B 15/12* | (2006.01) | |

(52) U.S. Cl.
CPC .......... *B29C 64/118* (2017.08); *B29C 64/209* (2017.08); *B29C 64/386* (2017.08); *B29C 70/06* (2013.01); *B29C 70/384* (2013.01); *B33Y 10/00* (2014.12); *B33Y 30/00* (2014.12); *B33Y 50/02* (2014.12); *B33Y 70/00* (2014.12); *B33Y 80/00* (2014.12); *B29B 15/122* (2013.01); *B29C 2035/0827* (2013.01); *B29K 2105/0058* (2013.01); *B29K 2105/08* (2013.01); *B29K 2105/12* (2013.01); *B29K 2105/16* (2013.01); *B29K 2307/04* (2013.01)

(58) Field of Classification Search
CPC ... B29C 64/205; B29C 64/209; B29C 64/147; B29C 64/10; B29C 64/124; B29C 64/153; B29C 64/118; B29C 64/386; B29C 64/106; B29C 35/0805; B29C 70/06; B29C 70/384; B33Y 10/00; B33Y 30/00; B33Y 50/02; B33Y 70/00; B33Y 80/00
See application file for complete search history.

(56) References Cited

U.S. PATENT DOCUMENTS

| | | |
|---|---|---|
| 3,984,271 A | 10/1976 | Gilbu |
| 3,993,726 A | 11/1976 | Moyer |
| 4,643,940 A | 2/1987 | Shaw et al. |
| 4,671,761 A | 6/1987 | Adrian et al. |
| 4,822,548 A | 4/1989 | Hempel |
| 4,851,065 A | 7/1989 | Curtz |
| 4,865,735 A | 9/1989 | Chu et al. |
| 5,002,712 A | 3/1991 | Goldmann et al. |
| 5,037,691 A | 8/1991 | Medney et al. |
| 5,296,335 A | 3/1994 | Thomas et al. |
| 5,340,433 A | 8/1994 | Crump |
| 5,746,967 A | 5/1998 | Hoy et al. |
| 5,866,058 A | 2/1999 | Batchelder et al. |
| 5,936,861 A | 8/1999 | Jang et al. |
| 6,153,034 A | 11/2000 | Lipsker |
| 6,459,069 B1 | 10/2002 | Rabinovich |
| 6,501,554 B1 | 12/2002 | Hackney et al. |
| 6,803,003 B2 | 10/2004 | Rigali et al. |
| 6,934,600 B2 | 8/2005 | Jang et al. |
| 7,795,349 B2 | 9/2010 | Bredt et al. |
| 8,221,669 B2 | 7/2012 | Batchelder et al. |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Peters et al. |
| 9,770,876 B2 | 9/2017 | Farmer et al. |
| 9,782,926 B2 | 10/2017 | Witzel et al. |
| 10,647,058 B2 * | 5/2020 | Tyler ..................... B29C 48/266 |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0165304 A1 | 11/2002 | Mulligan et al. |
| 2003/0044539 A1 | 3/2003 | Oswald |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2005/0006803 A1 | 1/2005 | Owens |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2007/0003650 A1 | 1/2007 | Schroeder |
| 2007/0228592 A1 | 10/2007 | Dunn et al. |
| 2008/0176092 A1 | 7/2008 | Owens |
| 2009/0095410 A1 | 4/2009 | Oldani |
| 2011/0032301 A1 | 2/2011 | Fienup et al. |
| 2011/0143108 A1 | 6/2011 | Fruth et al. |
| 2012/0060468 A1 | 3/2012 | Dushku et al. |
| 2012/0159785 A1 | 6/2012 | Pyles et al. |
| 2012/0231225 A1 | 9/2012 | Mikulak et al. |
| 2012/0247655 A1 | 10/2012 | Erb et al. |
| 2013/0115324 A1 | 5/2013 | Hegler |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0241114 A1 | 9/2013 | Ravich et al. |
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0061974 A1 | 3/2014 | Tyler |
| 2014/0159284 A1 | 6/2014 | Leavitt |
| 2014/0232035 A1 | 8/2014 | Bheda |
| 2014/0268604 A1 | 9/2014 | Wicker et al. |
| 2014/0291886 A1 | 10/2014 | Mark et al. |
| 2014/0361460 A1 | 12/2014 | Mark |
| 2015/0136455 A1 | 5/2015 | Fleming |
| 2015/0201500 A1 | 7/2015 | Shinar et al. |
| 2015/0367576 A1 | 12/2015 | Page |
| 2016/0009029 A1 | 1/2016 | Cohen et al. |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0082641 A1 | 3/2016 | Bogucki et al. |
| 2016/0082659 A1 | 3/2016 | Hickman et al. |

(56) References Cited

U.S. PATENT DOCUMENTS

| | | |
|---|---|---|
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0239884 A1 | 8/2017 | Batchelder et al. |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0266887 A1 | 9/2017 | Roviaro et al. |
| 2017/0274585 A1 | 9/2017 | Armijo et al. |
| 2017/0284876 A1 | 10/2017 | Moorlag et al. |
| 2017/0291364 A1 | 10/2017 | Worner |
| 2017/0326817 A1 | 11/2017 | Portet et al. |
| 2018/0015668 A1 | 1/2018 | Koskas et al. |
| 2018/0071986 A1 | 3/2018 | Buller et al. |
| 2018/0093413 A1 | 4/2018 | Yuasa et al. |
| 2018/0207863 A1 | 7/2018 | Porter et al. |
| 2018/0250876 A1 | 9/2018 | Michel et al. |
| 2018/0282542 A1 | 10/2018 | Chaplin et al. |
| 2018/0326659 A1 | 11/2018 | Gleyal-Martinez |
| 2018/0370129 A1 | 12/2018 | Natale et al. |
| 2018/0370130 A1 | 12/2018 | Duffner et al. |
| 2019/0022936 A1 | 1/2019 | Mansson et al. |

FOREIGN PATENT DOCUMENTS

| | | |
|---|---|---|
| EP | 3219474 A1 | 9/2017 |
| EP | 3409452 A1 | 12/2018 |
| EP | 3409453 A1 | 12/2018 |
| KR | 100995983 B1 | 11/2010 |
| KR | 101172859 B1 | 8/2012 |
| WO | 2013017284 A2 | 2/2013 |
| WO | 2016011252 A1 | 1/2016 |
| WO | 2016088042 A1 | 6/2016 |
| WO | 2016088048 A1 | 6/2016 |
| WO | 2016110444 A1 | 7/2016 |
| WO | 2016125138 A2 | 8/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Gibson, Ian, et al. Additive Manufacturing Technologies. (Electronic Resource): 3D Printing, Rapid Prototyping, and Direct Digital Manufacturing. pp. 157-160. New York, NY: Springer, New York: Imprint: Springer, 2015., 2015. EBSCOhost. (Year: 2015).

Hyouk Ryeol Choi and Se-gon Roh, In-pipe Robot with Active Steering Capability for Moving Inside of Pipelines, Bioinspiration

(56) References Cited

OTHER PUBLICATIONS and Robotics: Walking and Climbing Robots, Sep. 2007, p. 544, I-Tech, Vienna, Austria.

International Search Report dated Oct. 25, 2017 for PCT/US17/45353 to CC3D LLC Filed Aug. 3, 2017.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

\* cited by examiner

CONTROL METHODS FOR ADDITIVE MANUFACTURING SYSTEM

RELATED APPLICATIONS

This application is continuation of and claims the benefit of priority from U.S. application Ser. No. 15/603,328 that was filed on Jun. 2, 2017, which is based on and claims priority from Provisional Application No. 62/383,801 that was filed on Sep. 6, 2016, the contents of all of which are expressly incorporated herein by reference. This application is also a continuation-in-part application of and claims the benefit of priority from U.S. application Ser. No. 16/401,541 that was filed on May 2, 2019, which is a continuation of and claims the benefit of priority from U.S. application Ser. No. 15/268,156 that was filed on Sep. 16, 2016, which is based on and claims the benefit of priority from U.S. application Ser. No. 13/975,300 that was filed on Aug. 24, 2013, which is based on and claims the benefit of priority from U.S. Provisional Application No. 61/694,253 that was filed on Aug. 29, 2012, the contents of all of which are expressly incorporated herein by reference.

TECHNICAL FIELD

The present disclosure relates generally to a manufacturing system and, more particularly, to methods of controlling an additive manufacturing system.

BACKGROUND

Extrusion manufacturing is a known process for producing continuous structures. During extrusion manufacturing, a liquid matrix (e.g., a thermoset resin or a heated thermoplastic) is pushed through a die having a desired cross-sectional shape and size. The material, upon exiting the die, cures and hardens into a final form. In some applications, UV light and/or ultrasonic vibrations are used to speed the cure of the liquid matrix as it exits the die. The structures produced by the extrusion manufacturing process can have any continuous length, with a straight or curved profile, a consistent cross-sectional shape, and excellent surface finish. Although extrusion manufacturing can be an efficient way to continuously manufacture structures, the resulting structures may lack the strength required for some applications.

Pultrusion manufacturing is a known process for producing high-strength structures. During pultrusion manufacturing, individual fiber strands, braids of strands, and/or woven fabrics are coated with or otherwise impregnated with a liquid matrix (e.g., a thermoset resin or a heated thermoplastic) and pulled through a stationary die where the liquid matrix cures and hardens into a final form. As with extrusion manufacturing, UV light and/or ultrasonic vibrations are used in some pultrusion applications to speed the cure of the liquid matrix as it exits the die. The structures produced by the pultrusion manufacturing process have many of the same attributes of extruded structures, as well as increased strength due to the integrated fibers. Although pultrusion manufacturing can be an efficient way to continuously manufacture high-strength structures, the resulting structures may lack the form (shape, size, and/or precision) required for some applications.

The disclosed methods are directed to addressing one or more of the problems set forth above and/or other problems of the prior art.

SUMMARY

In one aspect, the present disclosure is directed to a method for controlling an additive manufacturing system. The method may include causing a head to discharge composite material along a first trajectory, and activating a cure enhancer to at least partially cure composite material discharging from the head along the first trajectory. The method may also include selectively deactivating the cure enhancer as the head nears a corner location, moving the head to a second trajectory after the head reaches the corner location, and reactivating the cure enhancer after moving the head to the second trajectory.

In another aspect, the present disclosure is directed to another method for controlling an additive manufacturing system. This method may include causing a head to discharge composite material along a first trajectory toward a corner location. The method may also include causing the head to discharge a minimum length of composite material after the head has passed the corner location during movement along the first trajectory, and moving the head and the minimum length of the composite material to a second trajectory.

In yet another aspect, the present disclosure is directed to yet another method for controlling an additive manufacturing system. This method may include causing a head to discharge composite material along a first trajectory, activating a cure enhancer to at least partially cure composite material discharging from the head along the first trajectory, and pausing movement of the head at an end of the first trajectory. The method may also include selectively deactivating the cure enhancer after pausing movement of the head, and causing the head to discharge a minimum length of composite material during movement to a start of a second trajectory while the cure enhancer is deactivated. The method may further include reactivating the cure enhancer after the head has been moved to the start of the second trajectory, pausing movement of the head at the start of the second trajectory, and moving the head along the second trajectory while causing the head to discharge composite material and while the cure enhancer is active.

DETAILED DESCRIPTION

Figure 1:
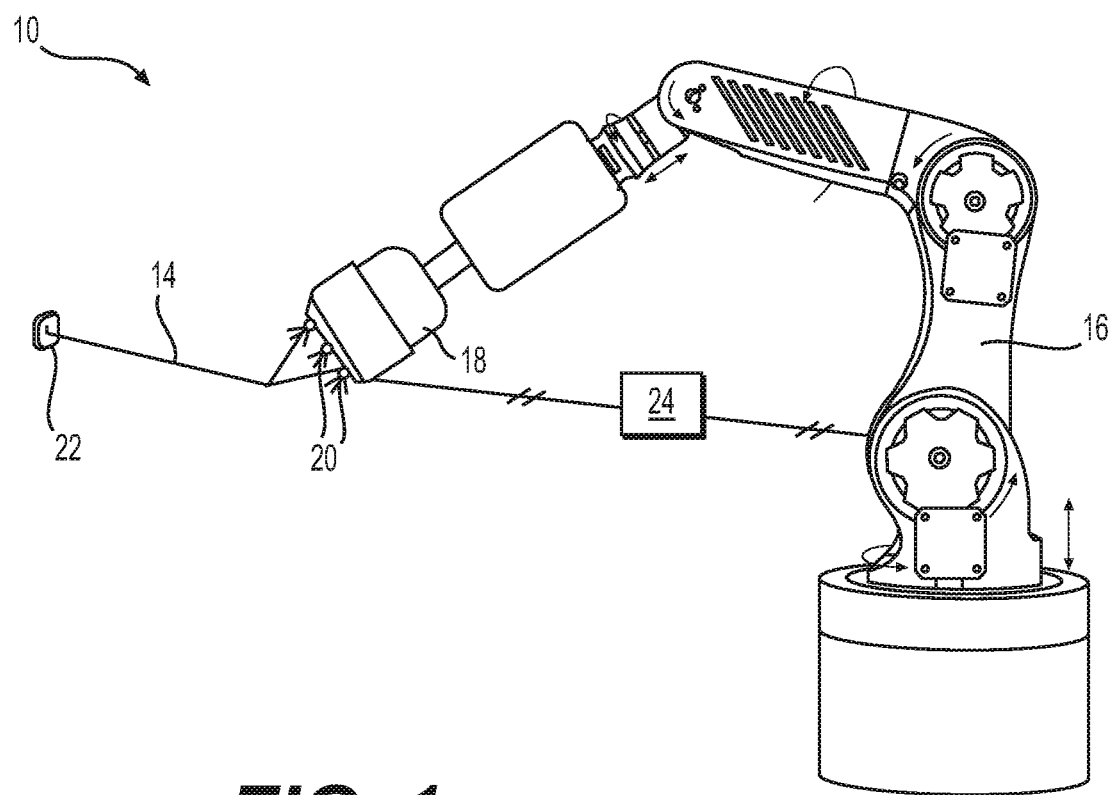
FIGS. 1 and 2 are diagrammatic illustrations of exemplary disclosed manufacturing systems.
Figure 2:
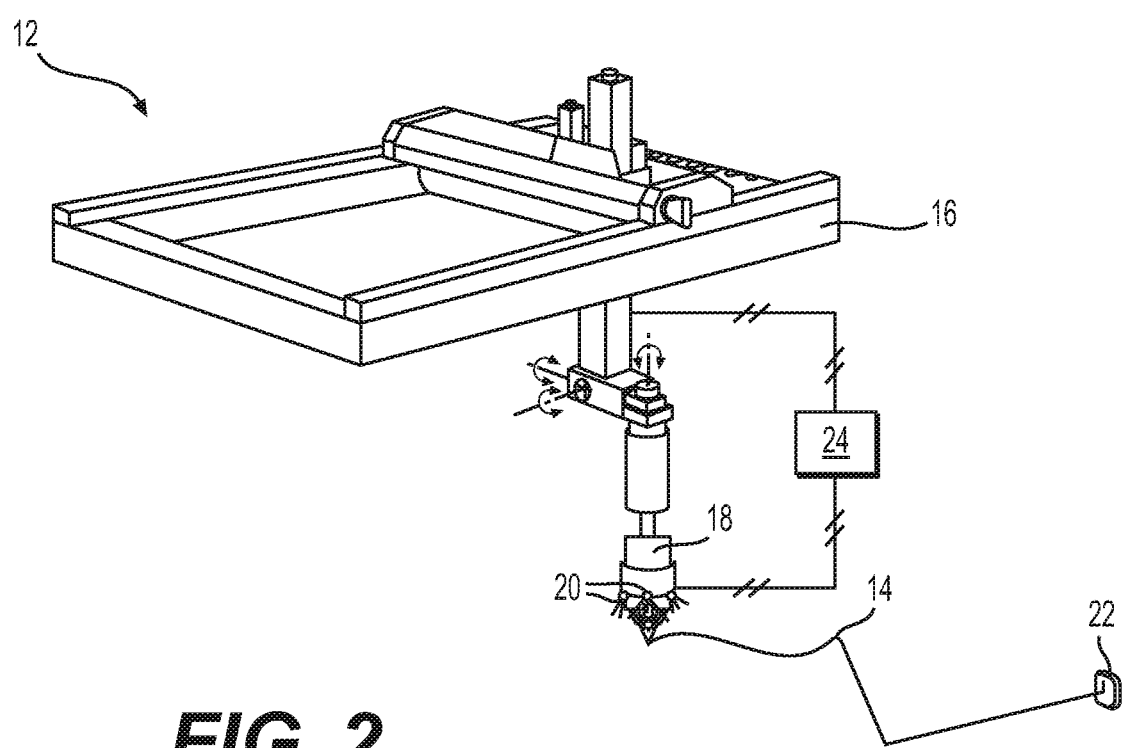

FIGS. 1 and 2 illustrate different exemplary systems 10 and 12, which may be used to continuously manufacture composite structures 14 having any desired cross-sectional shape (e.g., circular, flat, or polygonal). Each of systems 10, 12 may include at least a support 16 and a head 18. Head 18 may be coupled to and moved by support 16. In the disclosed embodiment of FIG. 1, support 16 is a robotic arm capable of moving head 18 in multiple directions during fabrication of structure 14, such that a resulting longitudinal axis of structure 14 is three-dimensional. In the embodiment of FIG. 2, support 16 is an overhead gantry also capable of moving head 18 in multiple directions during fabrication of structure 14. Although supports 16 of both embodiments are shown as being capable of 6-axis movements, it is contemplated that any other type of support 16 capable of moving head 18 in the same or in a different manner could also be utilized, if desired. In some embodiments, a drive may mechanically couple head 18 to support 16, and may include components that cooperate to move and/or supply power or materials to head 18.

Head 18 may be configured to receive or otherwise contain a matrix material. The matrix material may include any type of matrix material (e.g., a liquid resin, such as a zero-volatile organic compound resin; a powdered metal; etc.) that is curable. Exemplary resins include thermosets, epoxy resins, polyester resins, cationic epoxies, acrylated epoxies, urethanes, esters, thermoplastics, photopolymers, polyepoxides, and more. In one embodiment, the matrix material inside head 18 may be pressurized, for example by an external device (e.g., an extruder or another type of pump—not shown) that is fluidly connected to head 18 via a corresponding conduit (not shown). In another embodiment, however, the pressure may be generated completely inside of head 18 by a similar type of device. In yet other embodiments, the matrix material may be gravity-fed through head 18. In some instances, the matrix material inside head 18 may need to be kept cool and/or dark to inhibit premature curing; while in other instances, the matrix material may need to be kept warm for the same reason. In either situation, head 18 may be specially configured (e.g., insulated, chilled, and/or warmed) to provide for these needs.

The matrix material may be used to coat, encase, or otherwise surround any number of continuous reinforcements (e.g., separate fibers, tows, rovings, and/or sheets of material) and, together with the reinforcements, make up at least a portion (e.g., a wall) of composite structure 14. The reinforcements may be stored within (e.g., on separate internal spools—not shown) or otherwise passed through head 18 (e.g., fed from external spools). When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials encased in the matrix material discharging from head 18.

The reinforcements may be exposed to (e.g., coated with) the matrix material while the reinforcements are inside head 18, while the reinforcements are being passed to head 18, and/or while the reinforcements are discharging from head 18, as desired. The matrix material, dry reinforcements, and/or reinforcements that are already exposed to the matrix material (e.g., wetted reinforcements) may be transported into head 18 in any manner apparent to one skilled in the art.

One or more cure enhancers (e.g., a UV light, an ultrasonic emitter, a laser, a heater, a catalyst dispenser, etc.) 20 may be mounted proximate (e.g., within or on) head 18 and configured to enhance a cure rate and/or quality of the matrix material as it is discharged from head 18. Cure enhancer 20 may be controlled to selectively expose surfaces of structure 14 to energy (e.g., UV light, electromagnetic radiation, vibrations, heat, chemical catalyst, etc.) during the formation of structure 14. The energy may increase a rate of chemical reaction occurring within the matrix material, sinter the material, harden the material, or otherwise cause the material to cure as it discharges from head 18. In the depicted embodiments, cure enhancer 20 includes multiple LEDs (e.g., 6 different LEDs) that are equally distributed about a center axis of head 18. However, it is contemplated that any number of LEDs (or other energy sources) could alternatively be utilized for the disclosed purposes and/or arranged in another manner (e.g., unequally distributed, arranged in a row, etc.). The amount of energy produced by cure enhancer 20 may be sufficient to cure the matrix material before structure 14 axially grows more than a predetermined length away from head 18. In one embodiment, structure 14 is completely cured before the axial growth length becomes equal to an external diameter of the matrix-coated reinforcement.

The matrix material and reinforcement may be discharged from head 18 via at least two different modes of operation. In a first mode of operation, the matrix material and reinforcement are extruded (e.g., pushed under pressure and/or mechanical force) from head 18, as head 18 is moved by support 16 to create the 3-dimensional shape of structure 14. In a second mode of operation, at least the reinforcement is pulled from head 18, such that a tensile stress is created in the reinforcement during discharge. In this mode of operation, the matrix material may cling to the reinforcement and thereby also be pulled from head 18 along with the reinforcement, and/or the matrix material may be discharged from head 18 under pressure along with the pulled reinforcement. In the second mode of operation, where the matrix material is being pulled from head 18, the resulting tension in the reinforcement may increase a strength of structure 14, while also allowing for a greater length of unsupported material to have a straighter trajectory (i.e., the tension may act against the force of gravity to provide free-standing support for structure 14).

The reinforcement may be pulled from head 18 as a result of head 18 moving away from an anchor point 22. In particular, at the start of structure-formation, a length of matrix-impregnated reinforcement may be pulled and/or pushed from head 18, deposited onto an anchor point 22, and cured, such that the discharged material adheres to anchor point 22. Thereafter, head 18 may be moved away from anchor point 22, and the relative movement may cause the reinforcement to be pulled from head 18. It should be noted that the movement of reinforcement through head 18 could be assisted (e.g., via internal head mechanisms), if desired. However, the discharge rate of reinforcement from head 18 may primarily be the result of relative movement between head 18 and anchor point 22, such that tension is created within the reinforcement. It is contemplated that anchor point 22 could be moved away from head 18 instead of or in addition to head 18 being moved away from anchor point 22.

As can be seen in FIGS. 1 and 2, a controller 24 may be provided and is shown as being communicatively coupled with support 16, head 18, and any number and type of cure enhancers 20. Controller 24 may embody a single processor or multiple processors that include a means for controlling an operation of system(s) 10 and/or 12. For example, controller 24 may include one or more general- or special-purpose processors or microprocessors. Controller 24 may further include or be associated with a memory for storing data, such as design limits, performance characteristics, operational instructions, matrix characteristics, reinforcement characteristics, characteristics of structure 14, and corresponding parameters of each component of system(s) 10 and/or 12. Various other known circuits may be associated with controller 24, including power supply circuitry, signal-conditioning circuitry, solenoid/motor driver circuitry, communication circuitry, and other appropriate circuitry. Moreover, controller 24 may be capable of communicating with other components of system(s) 10 and/or 12 via wired and/or wireless transmission.

One or more maps may be stored in the memory of controller 24 and used during fabrication of structure 14. Each of these maps may include a collection of data in the form of lookup tables, graphs, and/or equations. In the disclosed embodiment, the maps are used by controller 24 to determine desired characteristics of cure enhancers 20, the associated matrix, and/or the associated reinforcements at different locations within structure 14. The characteristics may include, among others, a type, quantity, and/or configuration of reinforcement and/or matrix material to be discharged at a particular location within structure 14, an amount of curing that should be implemented, etc. Controller 24 may then correlate operation of support 16 (e.g., the location and/or orientation of head 18) and/or the discharge of material from head 18 (a type of material, desired performance of the material, cross-linking requirements of the material, a discharge rate, etc.) with the operation of cure enhancers 20, such that structure 14 is produced in a desired manner.

For example, controller 24 may be programmed to selectively implement a corning method, which can be used to make sharp, tight corners within structure 14. In particular, because cure enhancers 20 may begin to cure the resin in the matrix material as soon as it is discharged from head 18, under normal circumstances, support 16 may be unable to move head 18 completely around a pivot point at a desired corner location fast enough to create a sharp, tight corner before the resin is at least partially cured. Accordingly, unless otherwise accounted for, head 18 may normally create only rounded corners (e.g., corners having relatively large radiuses) within structure 14. Although acceptable for many applications, some structures 14 may require sharper, tighter corners (i.e., corners with smaller radiuses).

Controller 24 may be configured to selectively control operation of cure enhancers 20 and support 18 to create corners (e.g., 90° or 180° corners) having a desired radius. FIGS. 3-7 illustrate exemplary cornering methodologies that may be implemented by controller 24. FIGS. 3-7 will be discussed in more detail in the following section to further illustrate the disclosed concepts.

INDUSTRIAL APPLICABILITY

The disclosed methods may be used to create sharp, tight corners within an additively manufactured composite structure. These corners may allow the resulting structures to have wider application and/or to match required specifications to a higher degree. The disclosed methods will now be described in detail, with reference to FIGS. 1-7.

At a start of a manufacturing event, information regarding a desired structure 14 may be loaded into systems 10 and 12 (e.g., into controller 24, which may be responsible for regulating operations of support 16, head 18, and/or cure enhancer(s) 20—referring to FIGS. 1 and 2). This information may include, among other things, a size (e.g., diameter, wall thickness, length, etc.), a contour (e.g., a trajectory), surface features (e.g., corner location, corner angle, wall thickness, edge length, etc.), connection geometry (e.g., locations and sizes of couplings, tees, splices, etc.), desired weave patterns, weave transition locations, location-specific matrix stipulations, location-specific fiber stipulations, etc. It should be noted that this information may alternatively or additionally be loaded into systems 10 and 12 at different times and/or continuously during the manufacturing event, if desired. Based on the component information, one or more different reinforcements and/or matrix materials may be selectively installed and/or continuously supplied into systems 10 and 12. In some embodiments, the reinforcements may also need to be connected to a pulling machine (not shown) and/or to a mounting fixture (e.g., to anchor point 22). Installation of the matrix material may include filling head 18 and/or coupling of an extruder (not shown) to head 18.

The component information may then be used to control operation of systems 10 and 12. For example, the matrix-coated reinforcements may be pulled and/or pushed from head 18, while support 16 selectively moves head 18 in a desired manner, such that an axis of the resulting structure 14 follows a desired trajectory (e.g., a free-space, unsupported, 3-D trajectory). Cure enhancer(s) 20 may be active during discharge of the composite material from head 18, such that the material begins to cure immediately upon exiting a nozzle tip of head 18.

Figure 3:
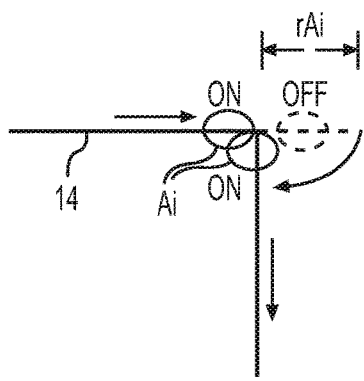
FIGS. 3 and 4 are control diagrams illustrating exemplary disclosed methods for controlling operations of the manufacturing systems of FIGS. 1 and 2.
Figure 4:
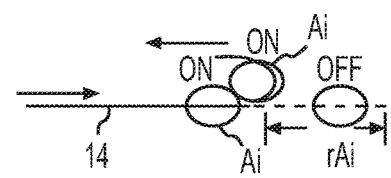

As shown in FIGS. 3 and 4, an area of irradiance $A_i$ generated by cure enhancer(s) 20 may straddle and/or encompass the composite material (i.e., the matrix material and reinforcements) discharging from head 18. A size, shape, wavelength, and/or energy intensity of irradiance area $A_i$ may be the result of the particular number and/or configuration of cure enhancer(s) 20 that are utilized at any given point in time to cure the resin within the matrix material. It should be noted that, while this area of irradiance $A_i$ is represented two-dimensionally in FIG. 3 by a circle or ellipse, the area could be three-dimensional and/or have another shape (e.g., triangular, rectangular, pyramidal, cylindrical, other polygonal, and/or irregular).

As head 18 approaches a corner (e.g., a 90° corner, a 180° corner, or an oblique angle corner) during material discharge, care should be taken such that the area of irradiance $A_i$ does not extend past the corner. This can be accommodated, for example, by controller 24 knowing the location of the corner to be constructed, tracking the movement of head 18 relative to the corner location (e.g., via feedback from one or more sensors and/or motors that makeup portions of support 16 and/or head 18—not shown), and selectively deactivating (or at least turning down to a lower intensity level) cure enhancer(s) 20 as a leading edge of the area of irradiance $A_i$ reaches the coordinates of the corner.

Controller 24 may continue to cause support 16 to move head 18 past the corner location (e.g., along the same generally straight trajectory used before reaching the corner location), while still discharging the composite material. Because cure enhancer(s) 20 may be inactive (or at least turned down in intensity) at this point in time, the discharging composite material may be less cured (e.g., completely uncured) and remain somewhat flexible. After a minimum amount of composite material (e.g., a minimum length of reinforcement) has been discharged from head 18, controller 24 may cause support 16 to pivot head 18 in an arc through a desired angle corresponding to known specifications of the corner (e.g., through about 90°, 180°, or another angle). In the disclosed embodiment, the minimum length may be about equal (e.g., within engineering tolerances) to a radius of the area of irradiance $A_i$. The pivoting motion may cause the reinforcements in the uncured composite material to also pivot about a tip end of the composite material that was already cured at the corner location, resulting in a sharper, tighter corner than could otherwise be realized. It should be noted that the uncured reinforcements may generally be taut during this pivoting motion.

After pivoting of head 18 through the desired angle and before causing head 18 to discharge additional composite material along a new trajectory at an exit of the corner location, controller 24 may reactivate cure enhancer(s) 20. Because the minimum length of uncured material pulled from head 18 may be about equal to the radius of the area of irradiance $A_i$, when cure enhancer(s) 20 are reactivated, a majority (e.g., all) of the uncured material that pivoted through the desired angle may then be cured in-place at its new location when cure enhancer(s) 20 are reactivated. Head 18 may then be caused to discharge additional material along its new trajectory while cure enhancer(s) 20 remain active. It should be noted that, although only the turning of cure enhancer(s) 20 on-and-off has been discussed in connection with the disclosed methods, it is contemplated that other characteristics of cure enhancer(s) 20 (e.g., irradiation intensity, wavelength, size, and/or shape) could similarly be coordinated with the location of head 18 during fabrication of structure 14.

It may be possible to cause head 18 to primarily move in just a single dimension during corner creation (e.g., during creation of 180° corners), if desired. That is, instead of pivoting head 18 through an arc (while keeping the associated reinforcements taut), head 18 could simply be caused to reverse direction and lay down an immediately adjacent track of material. In this situation, the associated reinforcements may not be maintained in a taut condition during the reversal, and only be pulled taut after head 18 has moved back along its original trajectory for a short distance. Similarly, instead of pivoting head 18 through an arc about the corner location (while keeping the associated reinforcements taut), head 18 could simply be translated in a straight line to a corresponding point on the new trajectory, at which the reinforcements would be pulled taught. This action may be faster, in some applications.

It is contemplated that, rather than waiting to pivot head 18 until the minimum length of material has been discharged in a straight line and left uncured, head 18 could instead be caused by controller 24 to simultaneously discharge uncured material during the pivoting motion until the minimum length has been achieved. This may result in faster fabrication of structure 14, in some applications.

In some applications, the material discharging from head 18 may form a ribbon or sheet having fibers arranged and/or discharged in a particular orientation. In these applications, controller 24 may be configured to cause head 18 (e.g., via activation of one or more motors of support 16) to rotate in the direction of pivoting, such that the fibers generally remain in their relative orientations during and after corner formation.

Figure 5:
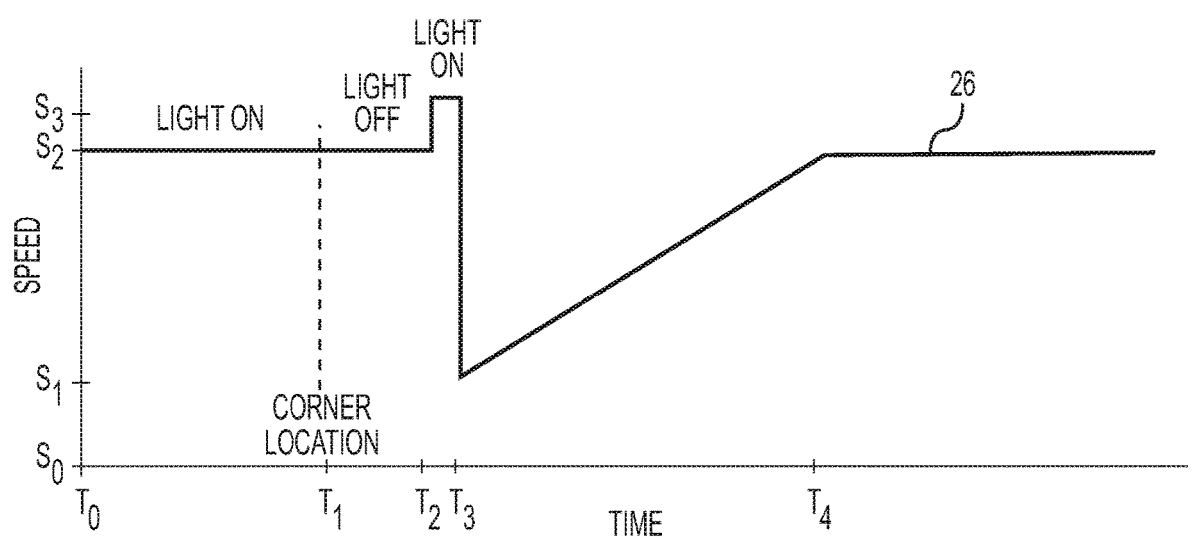
FIG. 5 is a graph depicting the control operations of FIGS. 3 and 4.

It may be helpful to adjust a travel speed of head 18 during formation of the corners described above. A graph 26 that is illustrated in FIG. 5 shows these adjustments. For example, as can be seen at a time $T_0$, head 18 may be controlled to discharge composite material at a normal travel speed $S_2$ (e.g., at a maximum rate acceptable for a specified quality of structure 14) while cure enhancer(s) 20 are active. The head travel speed may remain constant as the leading edge of the area of irradiance $A_i$ reaches the corner location at a time $T_1$ and UV cure enhancer(s) 20 are deactivated. The travel speed of head 18 may continue at a generally constant level, until the minimum length of uncured matrix material is discharged from head 18 and pivoted through the desired angle at a time $T_2$. After completing the specified pivot of head 18, however, controller 24 may step-up the travel speed of head 18 to a higher level $S_3$. Head 18 may spend only a short time at the higher speed level $S_3$, and then drop to a lower speed level $S_1$. This moment of higher-speed head travel may function to break away any matrix material that may have hardened on the nozzle tip of head 18 during corner creation (e.g., by generating a quick tug on the discharging material), while the slower subsequent head speed may help ensure that head 18 does not pull hard enough during curing at the corner to cause the corner to move away from the desired location (e.g., before the matrix material is fully cured). The speed of head 18 may gradually ramp back up to its normal speed as it moves away from the corner location.

Figure 6:
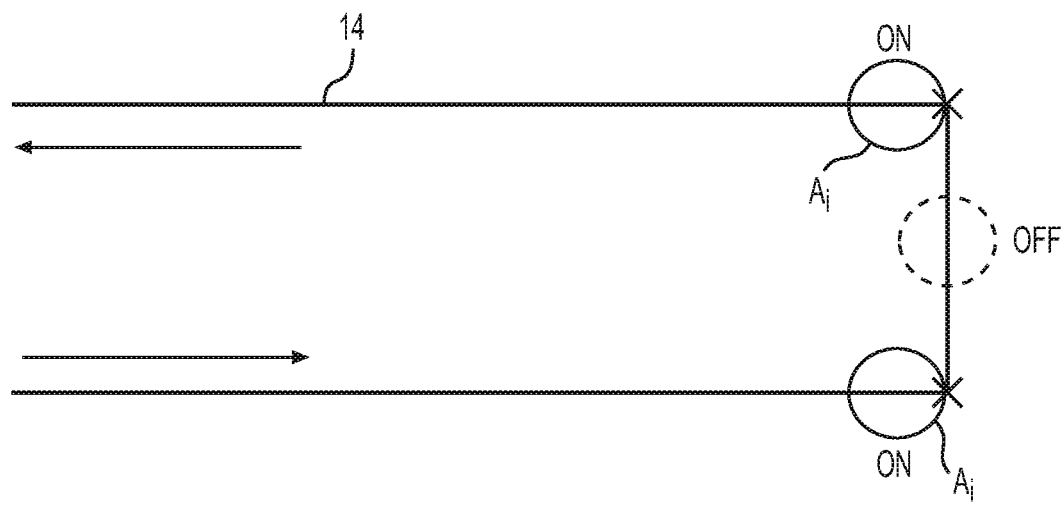
FIG. 6 is another control diagram illustrating another exemplary disclosed method for controlling operations of the manufacturing systems of FIGS. 1 and 2.
Figure 7:
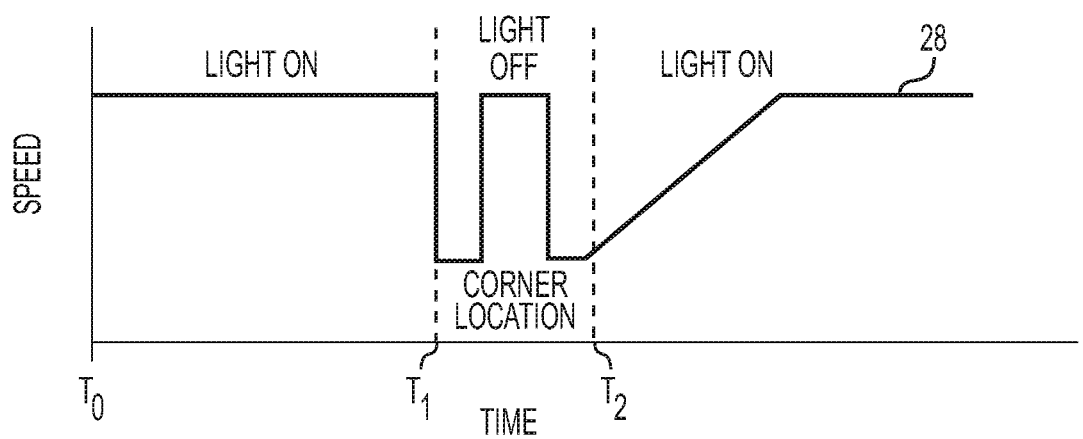
FIG. 7 is a graph depicting the control operations of FIG. 6.

Another exemplary method of manufacturing is illustrated in FIGS. 6 and 7. This method may primarily be used to move head 18 through a 180° change in trajectory (e.g., when laying down adjacent and/or overlapping tracks of composite material). As shown in FIG. 6, controller 24 may cause cure enhancer(s) 20 to be deactivated as the leading edge of the area of irradiance $A_i$ reaches the corner location. Like in the method described above (i.e., the method described in reference to FIGS. 3-5), cure enhancer(s) 20 may be deactivated at this point in time, while head 18 continues to discharge material. The length of material discharged and left uncured should be at least equal to a desired distance between adjacent or overlapping tracks. After moving to a start location of the adjacent track, cure enhancer(s) 20 may be reactivated. It is contemplated that this movement between the ending and starting points of adjacent tracks may be unidirectional and linear, compound and linear, or arcing. For example, before moving directly in a straight line (e.g., in an X-Y plane) from the ending point of a first track to the starting point of the adjacent track, head 18 may first be caused by controller 24 to move in another direction (e.g., in a direction generally orthogonal to the straight line—such as in a Z-direction, in a compound direction, or along an arcing trajectory). This movement may produce less bunching at the ends of the adjacent tracks, and also generate less stress within the reinforcements that results in less breakage.

In some instances, the method of FIG. 6 may result in loops of uncured matrix material being generated at ends of the adjacent tracks. This material may be cut away after fabrication of structure 14, if desired.

As shown in a graph 28 of FIG. 7, controller 24 may selectively cause head 18 to pause at the ends of each of the adjacent tracks (i.e., at the corner locations, each pause being represented by an X in FIG. 6). The first pause occurring at a time $T_1$ may allow for additional curing before head 18 moves away from its original trajectory. This may reduce a likelihood of pulling the ending point of the first track away from a previous placement. The second pause occurring at a time $T_2$ may allow for additional curing before head 18 moves along a new trajectory of the adjacent track. This may improve a likelihood of the starting point of the adjacent track remaining anchored at a desired location. Graph 28 of FIG. 7 also illustrates a ramp-up in speed following the second pause, allowing for a reduced force to be applied at the new anchor point until after a minimum amount of curing has taken place.

It will be apparent to those skilled in the art that various modifications and variations can be made to the disclosed methods. Other embodiments will be apparent to those skilled in the art from consideration of the specification and practice of the disclosed methods. It is intended that the specification and examples be considered as exemplary only, with a true scope being indicated by the following claims and their equivalents.

What is claimed is:

1. A method for controlling an additive manufacturing system, comprising:
   causing a head to discharge composite material along a first trajectory;
   activating a cure enhancer to at least partially cure composite material discharging from the head along the first trajectory;
   selectively deactivating the cure enhancer as the head nears a corner location;
   moving the head to a second trajectory after the head reaches the corner location; and
   reactivating the cure enhancer after moving the head to the second trajectory.

2. The method of claim 1, further including causing the head to discharge a minimum length of the composite material while the cure enhancer is deactivated at the corner location.

3. The method of claim 2, wherein the cure enhancer generates an area of irradiance on composite material discharging from the head.

4. The method of claim 3, wherein the minimum length is about equal to a radius of the area of irradiance.

5. The method of claim 4, wherein selectively deactivating the cure enhancer includes deactivating the cure enhancer as a leading edge of the area of irradiance reaches the corner location.

6. The method of claim 2, wherein causing the head to discharge a minimum length of composite material includes causing the head to continue discharging composite material along the first trajectory past the corner location.

7. The method of claim 6, wherein moving the head includes pivoting the head through an arc while maintaining the minimum length of the composite material taut.

8. The method of claim 2, wherein:
   moving the head to the second trajectory includes reversing direction of the head back adjacent the first trajectory; and
   reactivating the cure enhancer includes reactivating the cure enhancer only after the minimum length of the composite material becomes taut after the reversing.

9. The method of claim 1, further including causing the head to rotate about a central axis in a direction of the pivoting during pivoting.

10. The method of claim 1, wherein moving the head includes pivoting the head through at least 90°.

11. The method of claim 10, wherein pivoting the head includes pivoting the head through about 180°.

12. The method of claim 1, wherein all material along the first and second trajectories is at least partially cured by the cure enhancer prior to the head leaving the corner location along the second trajectory.

13. The method of claim 1, further including pausing movement of the head at the corner location.

14. The method of claim 1, further including causing the head to move in a direction generally orthogonal to the first trajectory after the head reaches the corner location and before moving the head to the second trajectory.

15. The method of claim 1, further including:
   receiving information associated with the corner location; and
   tracking movement of the head relative to the corner location.

16. A method for controlling an additive manufacturing system, comprising:
   causing a head to discharge composite material along a first trajectory toward a corner location;
   causing the head to discharge a minimum length of composite material after the head has passed the corner location during movement along the first trajectory; and
   moving the head and the minimum length of the composite material to a second trajectory.

17. The method of claim 16, wherein moving the head includes pivoting the head through an arc while maintaining the minimum length of composite material taut.

18. A method for controlling an additive manufacturing system, comprising:
   causing a head to discharge composite material along a first trajectory;
   activating a cure enhancer to at least partially cure composite material discharging from the head along the first trajectory;
   pausing movement of the head at an end of the first trajectory;
   selectively deactivating the cure enhancer after pausing movement of the head;
   causing the head to discharge a minimum length of composite material during movement to a start of a second trajectory while the cure enhancer is deactivated;
   reactivating the cure enhancer after the head has been moved to the start of the second trajectory;
   pausing movement of the head at the start of the second trajectory; and
   moving the head along the second trajectory while causing the head to discharge composite material and while the cure enhancer is active.

* * * * *